US009653009B2

(12) United States Patent
Rayhanian

(10) Patent No.: US 9,653,009 B2
(45) Date of Patent: May 16, 2017

(54) SLIPPERY SURFACE WARNING APPARATUS

(76) Inventor: Joseph Rayhanian, Beverly Hills, CA (US)

( * ) Notice: Subject to any disclaimer, the term of this patent is extended or adjusted under 35 U.S.C. 154(b) by 0 days.

(21) Appl. No.: 13/565,806

(22) Filed: Aug. 3, 2012

(65) Prior Publication Data

US 2014/0034851 A1 Feb. 6, 2014

(51) Int. Cl.

| | |
|---|---|
| ***G01J 3/10*** | (2006.01) |
| ***G09F 23/06*** | (2006.01) |
| ***G09F 15/00*** | (2006.01) |
| ***G09F 19/12*** | (2006.01) |
| ***G09F 19/22*** | (2006.01) |
| ***C11D 11/00*** | (2006.01) |
| *G09F 13/22* | (2006.01) |

(52) U.S. Cl.

CPC .......... *G09F 23/06* (2013.01); *C11D 11/0023* (2013.01); *G09F 15/0062* (2013.01); *G09F 19/12* (2013.01); *G09F 19/22* (2013.01); *G09F 2013/222* (2013.01)

(58) Field of Classification Search

CPC ........................................................ G09F 23/06

USPC ...... 250/504 R; 362/184, 225, 253, 368, 800

See application file for complete search history.

(56) References Cited

U.S. PATENT DOCUMENTS

2006/0121166 A1* 6/2006 Jeckle .................... A01K 85/00 426/395

2007/0291473 A1* 12/2007 Traynor ................. A01K 11/00 362/106

* cited by examiner

*Primary Examiner* — David Porta

*Assistant Examiner* — Meenakshi Sahu

(74) *Attorney, Agent, or Firm* — Avyno Law P.C.

(57) ABSTRACT

A Slippery Surface Warning Apparatus includes a Ultra-Violet Emitting Device, a Sign with Indicia, a Mounting Assembly, a Light-refracting liquid or powder to be added to a cleaning solution or other fluid, and a Light Housing. This Slippery Surface Warning Apparatus is used for the purpose of alerting people in the vicinity of a potential safety hazard whereby light emitted from the Ultra-Violet Emitting Device is directed to the slippery surface imbued with UV-Reflected cleaning solution for the purpose of showing persons where a slippery surface or hazardous condition is.

16 Claims, 5 Drawing Sheets

SLIPPERY SURFACE WARNING APPARATUS

FIELD OF THE INVENTION

Figure 1:
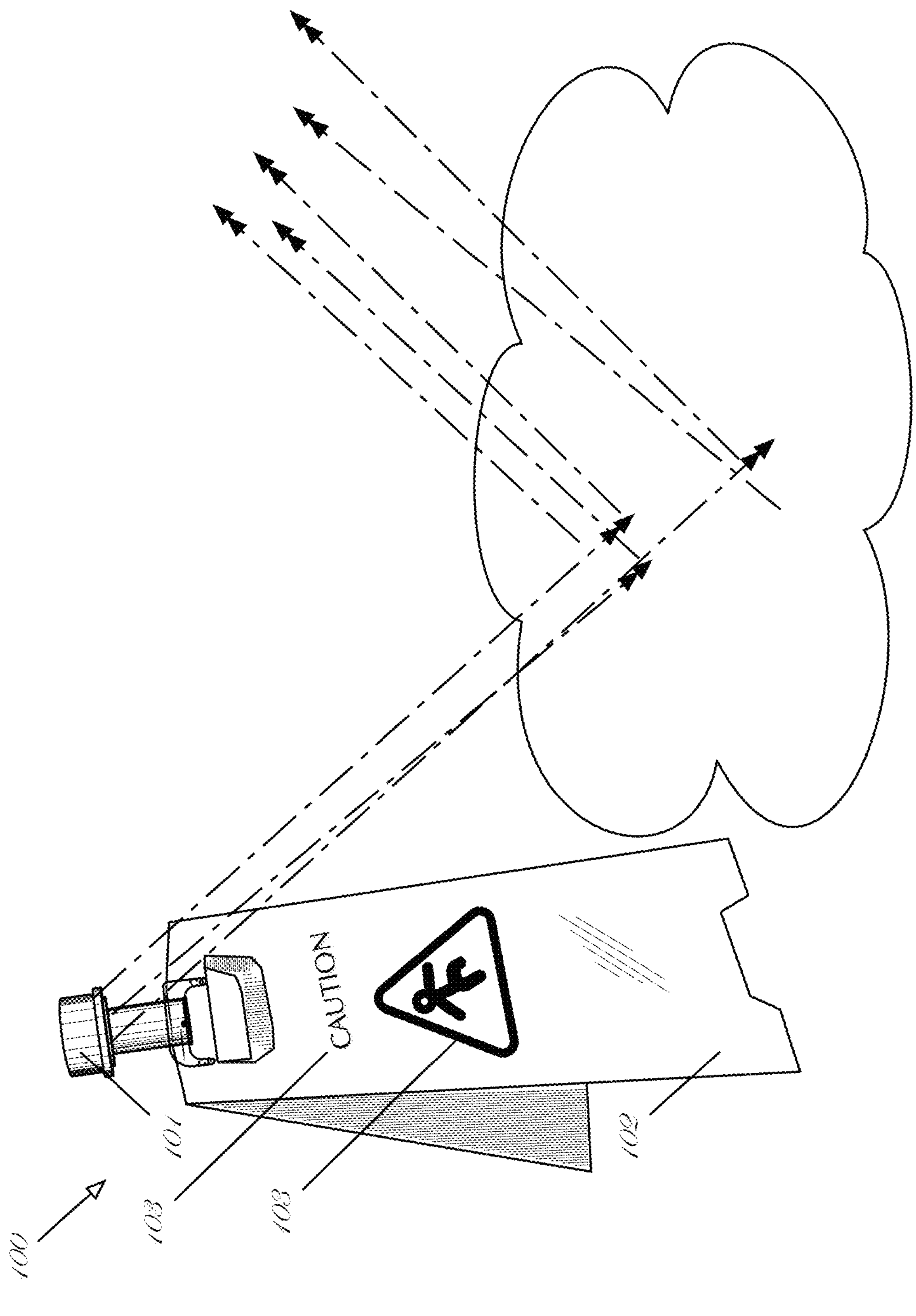

The present invention is in the area of safety equipment and more particularly pertains to a Slippery Surface Warning Apparatus for alerting people in the vicinity of a potential safety hazard.

BACKGROUND

In virtually every business, most notably businesses with visiting customers or clients, it is incumbent upon the employees to maintain the floors and other surfaces in a professional manner. This means that floors have to be cleaned and sanitized daily, and oftentimes several times a day depending upon the amount of foot traffic. In addition, to keep up appearances, some floors may have to be waxed, buffed, and treated with various chemicals, several of which may be in fluid form.

To this end, many businesses, or even property management corporations with condominiums and apartments task their employees with the assignment of polishing, cleaning, or otherwise treating various surfaces such as floors. One example is a retail or service location open for business 24 hours per day such as various grocery stores, or fitness gym establishments. On occasion, various treatments must be made to the floors or other surfaces, which may create a hazardous condition on the floor. And although the employee may be able to warn a patron of the condition himself, there may be times when the patron may be out of his or her line of sight (eg. Her back is to the patron).

A related concern along similar lines is that one of the greatest concerns of any retail store such as a grocery store, or the like, is the danger of slip and fall litigation. Each year, many store customers wind up slipping on slippery surfaces in various aisles at a time before an employee can clean it up and make the premises safe for customers. Oftentimes, these slippery surfaces come from leaking beverage containers or other liquid filled containers, which may have been punctured in transit, or through the handling of either employees or customers.

For these reasons, many lawsuits are filed each year, which engenders an extraordinary expense to brick and mortar-based industries. As a result, these stores have been required to carry various insurance policies, which charge hefty premiums.

In order to mitigate their exposure, many restaurants and stores have implemented 15 to 30 minute sweep checks, which require employees to sweep the floor on all the aisles and to keep a lookout for dangerous slippery surfaces. And when an employee spots a slippery surface, they must immediately stop what they are doing and go ahead and find a mop, sign, etc. to make sure no one gets hurt.

Unfortunately, there may be times when an employee may not be able to sufficiently remove the fluids from the floor immediately. This may be due to the relative toxicity of the fluids, or perhaps the existence of additional slippery surfaces elsewhere. And in the case where the fluids are transparent, their opacity lends itself to an even greater safety threat.

Therefore, what is clearly needed in the art is a system which will clearly alert to persons where a dangerous slippery surface exists and precisely the borders of that slippery surface.

SUMMARY

In general, in a first aspect, the Slippery Surface Warning Apparatus features a Ultra-Violet Emitting Device, a Sign with Indicia, a Mounting Assembly, a Light-refracting liquid or powder to be added to a cleaning solution or other fluid, a Light Housing. Through the use thereof, light emitted from the Ultra-Violet Emitting Device is directed to the slippery surface imbued with UV-Reflected cleaning solution for the purpose of showing persons where a slippery surface or hazardous condition is.

The features and advantages described in this summary and the following detailed description are not all-inclusive. Many additional features and advantages will be apparent to one of ordinary skill in the art in view of the drawings, specification, and claims thereof.

BRIEF DESCRIPTION OF THE DRAWING FIGURES

Figure 2:
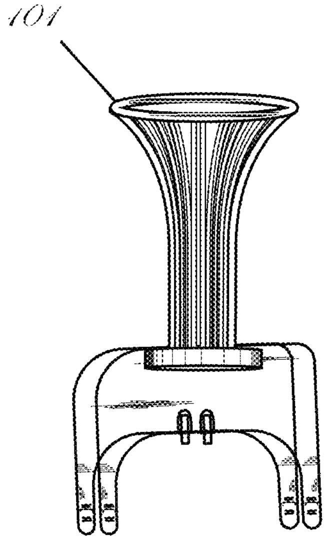
Figure 3:
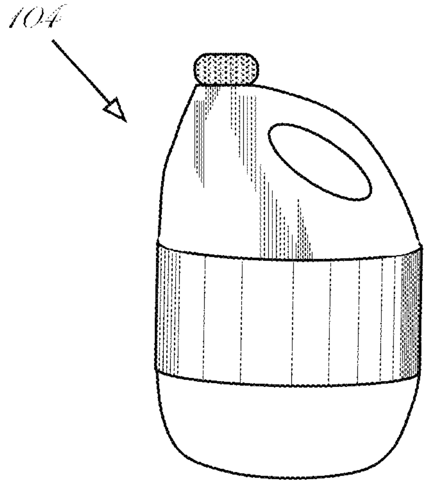
Figure 4:
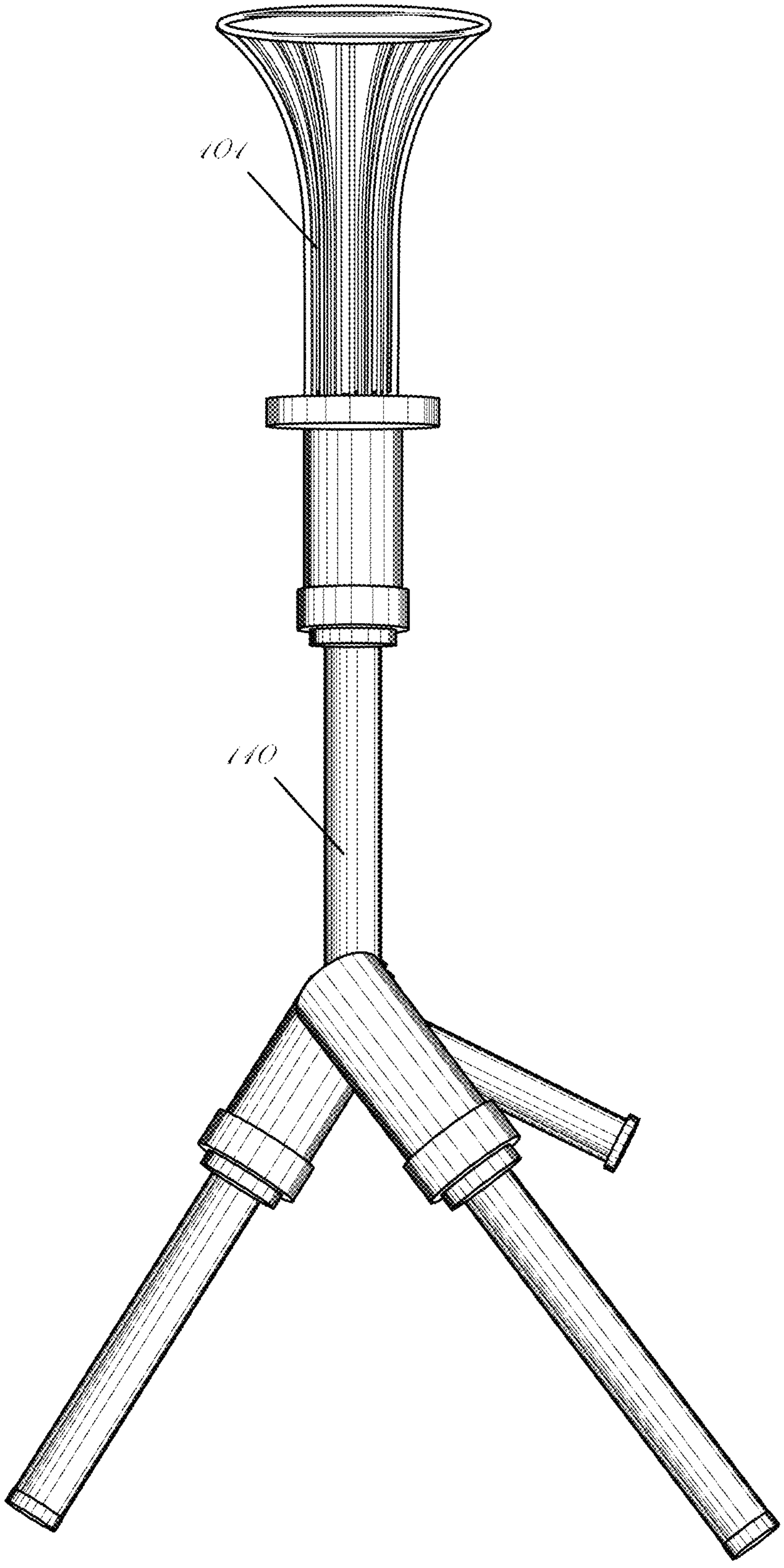
Figure 6:
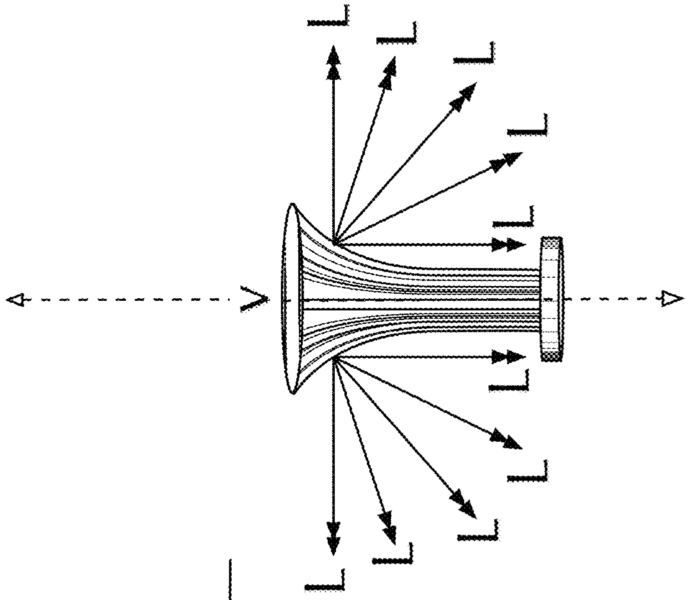
Figure 5:
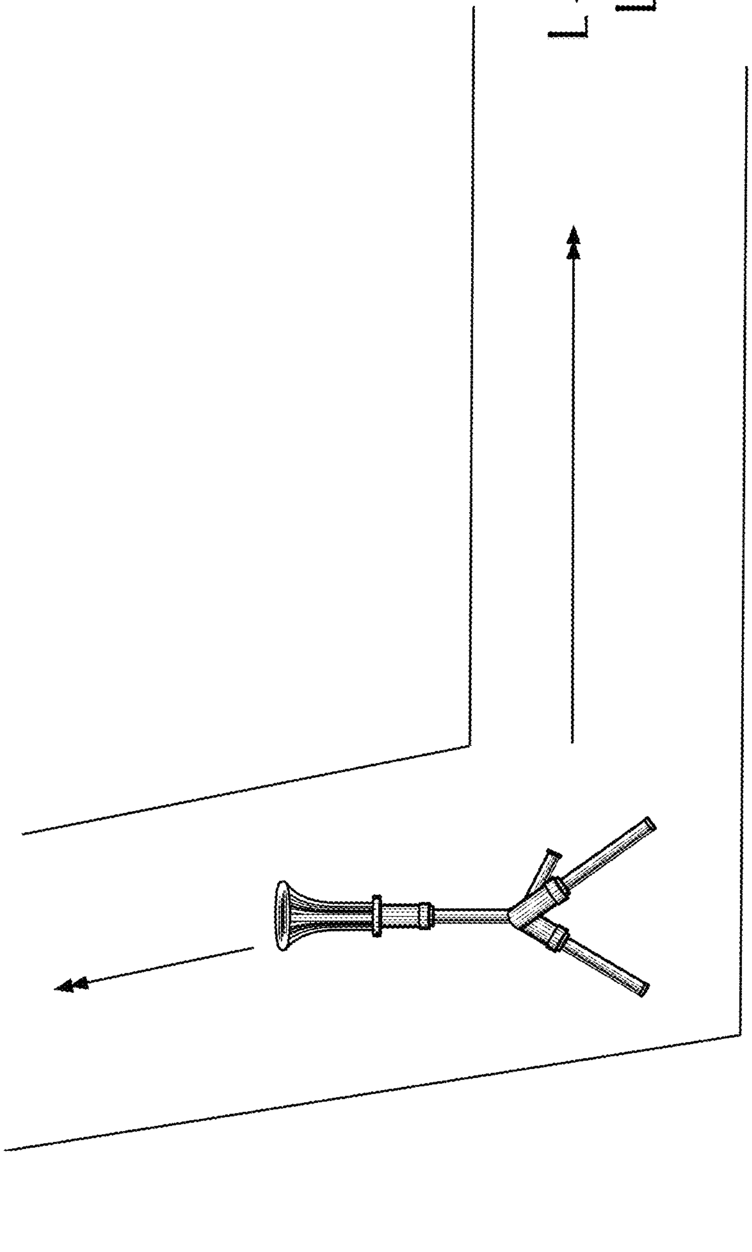
Figure 7:
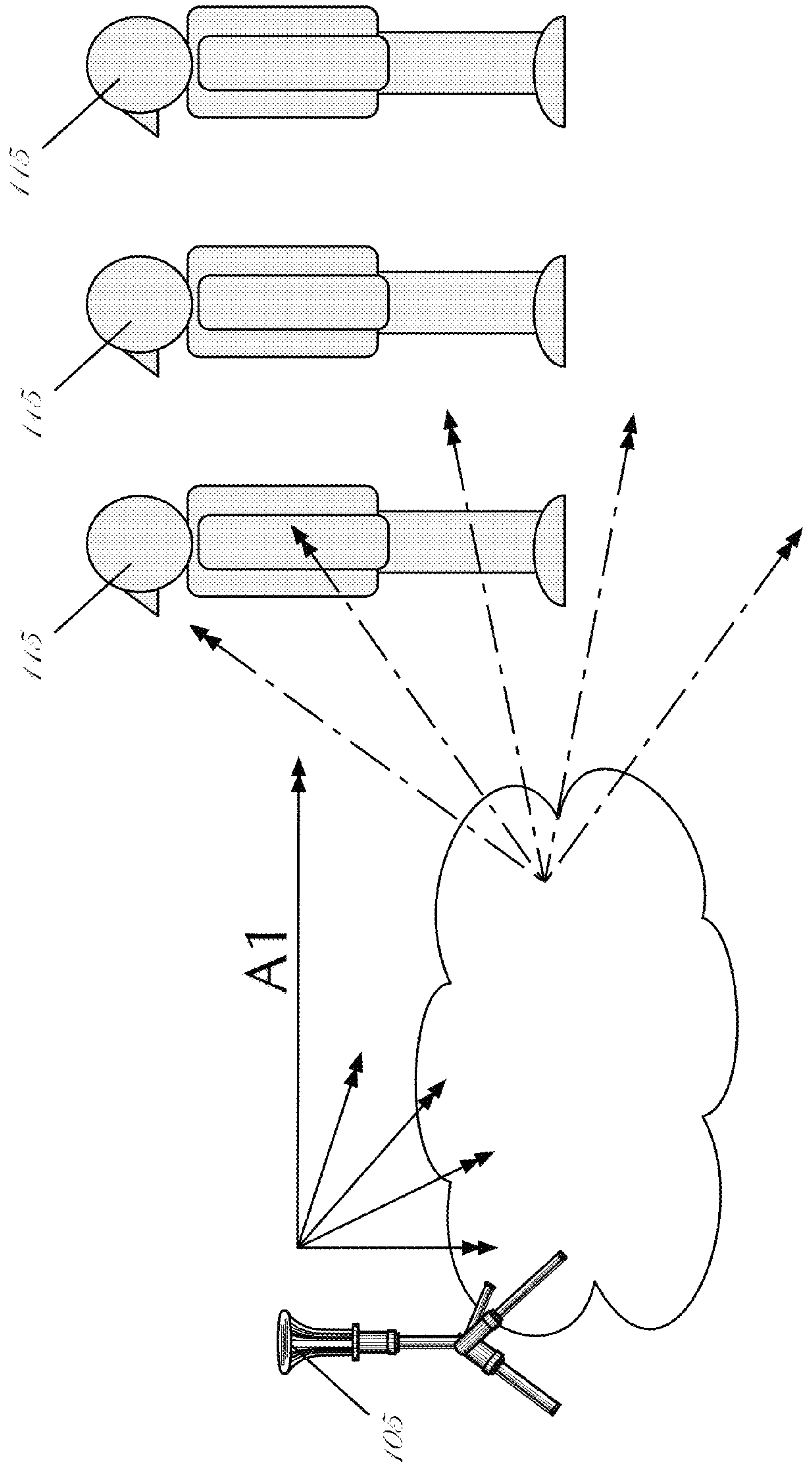

FIG. 1 is a perspective view of an embodiment.
FIG. 2 is a perspective view of an embodiment.
FIG. 3 is an elevated view of an embodiment.
FIG. 4 is a perspective view of an embodiment.
FIG. 5 is a perspective view of an embodiment.
FIG. 6 is an elevated view of an embodiment.
FIG. 7 is a perspective view of an embodiment.

DETAILED DESCRIPTION

According to an embodiment of the present invention, a unique Slippery Surface Warning Apparatus is provided for the purpose of alerting people in the vicinity of a potential safety hazard by clearly delineating exactly the boundaries of the treated surface whether it is a floor, table, workstation, etc. The embodiments are described in enabling detail below.

FIG. 1 illustrates that the Slippery Surface Warning Apparatus 100 includes a Ultra-Violet Emitting Device 101, a Sign with Indicia 102, a Mounting Assembly 103, a Light-refracting liquid or powder to be added to a cleaning solution or other fluid 104, and a Light Housing 105.

The Ultra-Violet Emitting Device 101 is used for the purpose of illuminating the slippery surface or hazardous condition. In one embodiment, the Ultra-Violet Emitting Device 101 has an LED component. This Ultra-Violet Emitting Device emits ultra-violet light or radiation in all directions) (360°) at a range of wavelengths responsive with the UV Solution described below. Moreover, the device will have a flash setting or a strobe setting. In some embodiments, the ultra-violet emitting device will operate on rechargeable batteries. The Ultra-Violet Emitting Device is disposed on top of the sign. It should be noted here that other light emitting modules might be used interchangeably with LED components. As such, the aforementioned embodiment should not be construed as limited to only the utilization of LED emitting devices.

The Sign with Indicia 102 is used for the purpose of elevating the ultra-violet emitting device above the slippery surface. In one embodiment, the Sign with Indicia 102 has a warning regarding a slippery surface or other hazardous condition of which shoppers, or other people in the vicinity. Also, the Sign with Indicia is affixed with the mounting assembly. Moreover, in various implementations of an embodiment, the Sign with Indicia can be a sandwich board style frame.

FIG. 4 illustrates that in other embodiments, the light may be mounted on a tri-pod apparatus 110. Other similar mounting units may be used interchangeably.

The Mounting Assembly 103 is used for the purpose of affixing the ultra violet emitting device to the sign. In one embodiment, the Mounting Assembly 103 has a clamp. Also, the Mounting Assembly is affixed with the sign and the Ultra-Violet Emitting Device.

The Light-refracting liquid or powder to be added to a cleaning solution or other fluid 104 is used for the purpose of showing persons within the vicinity of the slippery surface or hazardous condition where the area is located. In one embodiment, the Light-refracting liquid or powder includes a combination of water and cleaning soap or cleaning solution for the purpose of cleaning the surface. Moreover, in one embodiment, the Light-refracting liquid or powder to be added to a cleaning solution or other fluid 104 has a reflective property to the light emitted from the Ultra-Violet Emitting Device within a predetermined range. The primary use of the fluid is to highlight the peripheral boundaries of the fluid on the ground in a clear, unmistakable, and in a loud fashion which is attention-grabbing. Also, the Light-refracting liquid or powder to be added to a cleaning solution or other fluid is imbued into a slippery surface on a surface.

In one embodiment, the light refracting liquid or powder is used to make a fluorescent solution which comprises water, cleaning soap, and fluorescent chemicals (in the form of dyes, powder, fluids, etc.).

In one embodiment, the light-refracting liquid or powder may be fluorescent in nature. However, other embodiments may utilize other similar compounds which achieve the same effect.

The Light Housing 105 is structured in such a way to emit light 360° with respect to the Vertical Axis or V as illustrated in FIG. 6. FIG. 7 illustrates that the Light Housing's primary light emissions are angled in such that the highest angle of light rays do not reach the eye-level of the patrons, customers, clients, etc. Instead, the reflected rays are refracted from the wet surface in an upwardly direction which does come into the patron's line of sight. In one embodiment, the Light Housing is contoured.

It will be apparent to the skilled artisan that there are numerous changes that may be made in embodiments described herein without departing from the spirit and scope of those embodiments. As such, the embodiments taught herein by specific examples are limited only by the scope of the claims that follow.

What is claimed is:

1. A slippery surface warning system for alerting people of a potential safety hazard on a surface in which the people walk, the warning system comprising:

a ultra-violet light emitting device;

a mounting unit for mounting the ultra-violet light emitting device on the unit; and a light-refracting substance for adding to a liquid, whereby the light-refracting substance, when added to a liquid imparts reflective properties on the liquid when illuminated by the ultra-violet light, for purposes of alerting people to a potential safety hazard.

2. The slippery surface warning system of claim 1, where the liquid is the safety hazard on the surface in which the people walk.

3. The slippery surface warning system of claim 1, where the liquid is a cleaning solution that is used on the surface in which the people walk to clean the surface.

4. The slippery surface warning system of claim 1, where the light-refracting substance is a liquid solution.

5. The slippery surface warning system of claim 1, where the light-refracting substance is a powder.

6. The slippery surface warning system of claim 1, where the mounting unit is a sign.

7. The slippery surface warning system of claim 6, where the sign include indicia for warning people of the safety hazard.

8. The slippery surface warning system of claim 1, where the ultra-violet emitting device is an LED light.

9. The slippery surface warning system of claim 1, where the ultra-violet emitting device is positioned on top of the mounting unit.

10. The slippery surface warning system of claim 1, where the mounting unit further includes a clamp for mounting the ultra-violet emitting device.

11. The slippery surface warning system of claim 1, where the ultra-violet emitting device is contained within a light housing that angles outward from the base to direct the light emitting from the device downward, toward the slippery surface.

12. A method for alerting people of a potential safety hazard on a surface in which the people walk, the method comprising the steps of applying a light-refractive substance on the surface for purposes of identify a safety hazard on the surface; and illuminating the surface by placing an ultra-violet emitting device within a predetermined ranges of the surface and directing ultra-violet light toward the surface to permit the light to reflect off the light-refracting substance.

13. The method for alerting people of a potential safety hazard on a surface of claim 12, where the light-refractive substance is mixed with liquid on the surface.

14. The method for alerting people of a potential safety hazard on a surface of claim 12, where the light-refractive substance is mixed with a liquid cleaning solution that is then applied directly onto the surface.

15. The method for alerting people of a potential safety hazard on a surface of claim 12, where the light-refractive substance is a liquid.

16. The method for alerting people of a potential safety hazard on a surface of claim 12, where the light-refractive substances is a powder.

* * * * *